UNITED STATES PATENT OFFICE.

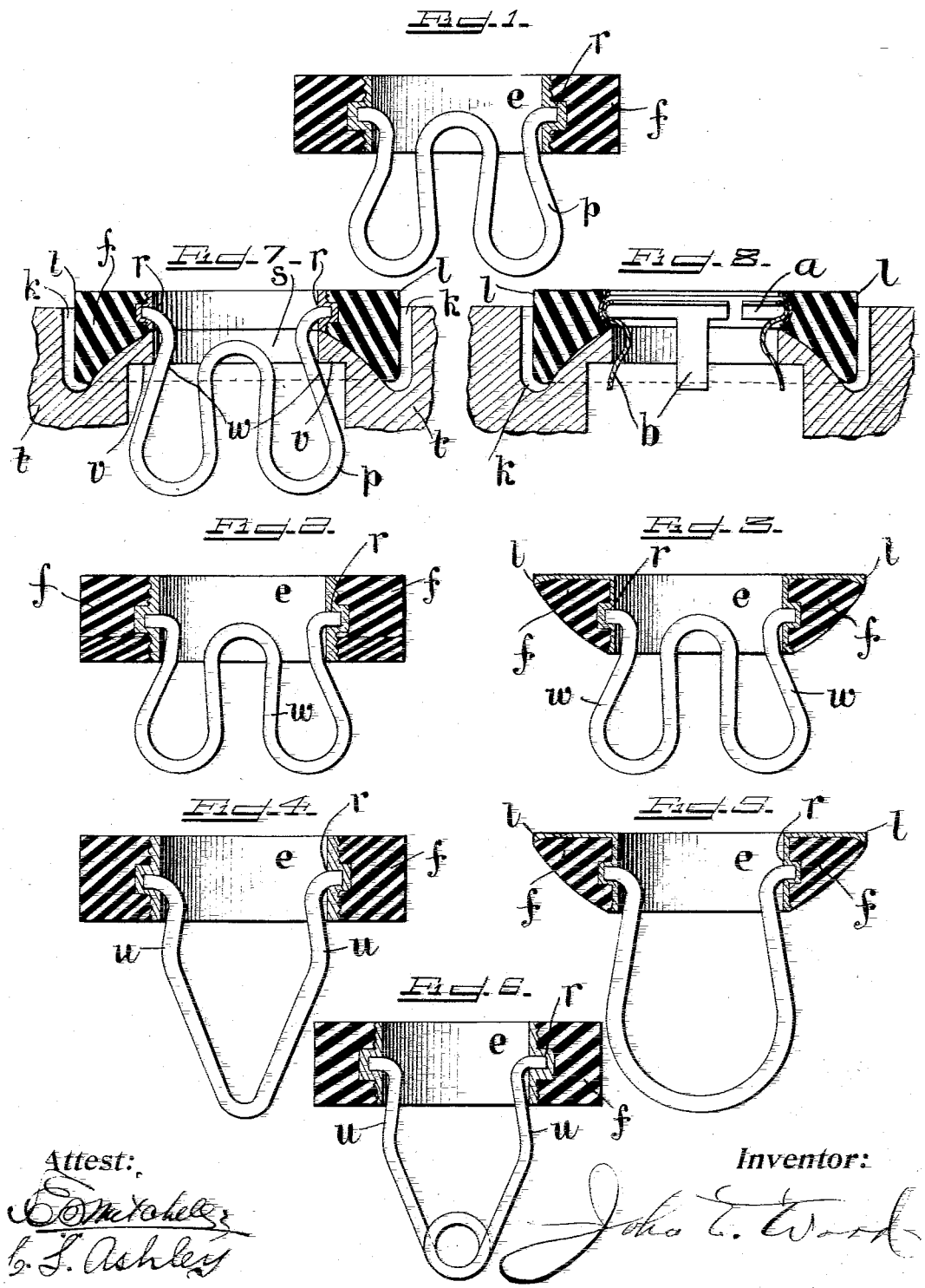

JOHN E. WARD, OF NEW YORK, N. Y., ASSIGNOR TO WARD EQUIPMENT COMPANY, OF NEW YORK, N. Y., A CORPORATION OF NEW YORK.

HOSE-COUPLING.

939,195. Specification of Letters Patent. Patented Nov. 2, 1909.

Application filed January 20, 1908. Serial No. 411,611.

*To all whom it may concern:*

Be it known that I, JOHN E. WARD, a citizen of the United States, and a resident of the borough of Manhattan, of the city of New York, in the county and State of New York, have made certain new and useful Improvements in Hose-Couplings, of which the following is a specification, reference being had to the accompanying drawings, forming a part hereof.

A common way of fastening a gasket in the head of a coupling has been to provide a spring which could be pressed into the opening in the head and fitted upon a shoulder therein, the ends of the spring engaging the gasket by being inserted into perforations in a central metallic thimble which formed a frame for the body or softer portion of the gasket. With such a construction, the steam or other fluid used in the system upon which the coupler was installed, would leak out through the perforations in the thimble and would permeate and soon destroy the body portion of the gasket.

One object of this invention, accordingly, has been to provide a construction in which such a spring retainer could be employed to hold the gasket within the coupling head without the accompanying disadvantage referred to.

Another object of the invention has been to improve the form of the retaining spring. This spring should have such flexibility as a whole, as will enable it to be comparatively easy of insertion into the coupler and withdrawal therefrom, and such flexibility must, so to speak, have its center at such a point in the spring that the ends thereof will not be liable to pull out of the gasket during its insertion or withdrawal; moreover, the spring must have sufficient resiliency and must be constructed to properly engage in the head of the gasket in order to hold the gasket well down thereupon. It has been sought therefore to provide a spring embodying all of these characteristics.

Still another object of the invention has been to improve the construction of what are referred to in the art as "oscillating gaskets." As these gaskets have been constructed heretofore, one face was rounded to fit a corresponding socket in the coupling head. While such a gasket will oscillate freely when new, the continued use thereof will cause the edge around the contacting face of the gasket, that is the flat face which abuts against the corresponding face of the coöperating gasket, to spread or expand, either from compression or wear. The result is that the gasket is prevented from oscillating at all on account of its bulging edge which makes it too large for it to swing about freely in its socket in the corresponding head. This difficulty is overcome in accordance with the present invention by providing the socket in the gasket and forming within a seat in the coupling head a suitable rounded or convex portion upon which the gasket is received and can swing and twist freely even though the edge of its contacting face may bulge through continued use.

All of the features of the invention will be more fully explained hereinafter with reference to the accompanying drawings in which.

Figure 1 is a view partly in section and partly in elevation of one of the improved gaskets. Figs. 2 and 3 are similar views, Fig. 2 showing the body portion of the gasket formed of two different materials, and Fig. 3 showing the invention applied to the old form of oscillating gasket. Figs. 4, 5 and 6 are similar views showing different forms of the improved retaining spring. Fig. 7 is a similar view showing the improved form of oscillating gasket together with a portion of the coupler head, and, Fig. 8 is a similar view showing the improved form of oscillating gasket in connection with a different form of fastening device therefor.

Referring particularly to Fig. 1, it will be seen that the gasket comprises essentially two parts, an inner frame portion $e$, generally of metal, and an outer main or body portion $f$ which is relatively softer than the inner frame portion or thimble $e$. The retaining spring $p$, as shown in Fig. 1, in a general way resembles the shape of the letter W and its free ends are inserted in recesses $r$ formed diametrically opposite each other in the thimble $e$. These recesses, as will be seen, do not perforate the thimble $e$ but extend only part way through the same so that it will be impossible for the steam pressure to leak out by way of the recesses $r$ from the coupler head and thus to permeate the structure of the body portion $f$ of the gasket, as has been possible in other constructions heretofore. In forming the recesses r, it is preferable to make the part of the thimble in which these recesses are formed a little thicker in order that a substantial recess may be made to receive the ends of the spring p, such thickened portion or portions of the frame or thimble serving to hold the body of the gasket more securely thereto.

Upon comparing Fig. 7, it will be seen that the insertion and withdrawal of the fastening spring p through the opening s in the coupler head t necessitates the compression of the spring to some extent and it will be understood that the compression of this spring during its insertion and withdrawal must take place without pulling the free ends of the spring out of the recesses r in the thimble e. It is desirable therefore that the center of flexibility of the spring shall be as far away as possible from the free ends thereof so that the movement of these ends in the recesses as the spring is bent shall be as slight as possible.

In Figs. 4, 5 and 6 different forms of retaining springs are shown in which the center of flexibility is practically at a portion of the spring farthest away from the free ends of the spring. In Fig. 4 the spring has a V-shape, the center of flexibility being at the apex of the V. In this spring the upper ends of the V are bent inwardly to form surfaces u which bear upon the shoulder v (Fig. 7) of the coupler to retain the gasket in position, and then outwardly to engage in the recesses in the thimble e. In Fig. 6 a similar spring is shown with a turn at the bottom or apex, the center of flexibility being at the turn. In Fig. 5 a U-shaped spring is shown, in which the center of flexibility is well away from the free ends of the spring, but the V-shaped springs are considered preferable.

Referring to Figs. 7 and 8, it will be seen that an oscillating gasket is shown in which one face of the gasket is cut away to fit upon a corresponding convexity w formed within a seat k in the coupler head. This seat k is of a larger diameter than the diameter of the gasket so that the gasket can move freely therein and twist and turn about as circumstances shall determine upon the convex portion w. In practice it is found that continued wear and compression upon the gasket tend to distort the relatively soft body portion f thereof so that the edges or periphery l around the contacting face of the gasket expand or spread whereby an oscillating gasket such as is shown in Fig. 3, for instance, would be prevented from oscillating in a closely fitting socket in the coupling head. In Fig. 8 a gasket similar to that of Fig. 7 is shown but the retaining means consists of a split ring a having short resilient retaining clips b, such ring being inserted within an annular recess in the gasket. The ring fits freely in the recess and permits the gasket to oscillate as it should.

It will be understood that the different features of the invention may be used separately and in other combinations than those illustrated and described herein.

I claim as my invention:

1. In a gasket for hose couplings and the like, the combination of an outer body portion, an inner frame portion, and a fastening spring to secure the gasket in a coupling, the frame being formed with a thickened portion having closed recesses to receive the end of the spring and said thickened portion serving to hold the frame and body of the gasket the more securely together.

2. In a gasket for hose couplings and the like, the combination of an outer body portion, an inner frame portion, and a V-shaped fastening spring to secure the gasket in a coupling, the frame being formed with a thickened portion having closed recesses to receive the end of the spring and said thickened portion serving to hold the frame and body of the gasket the more securely together.

3. In a gasket for hose couplings and the like, the combination of an outer body portion, an inner frame portion, and a V-shaped fastening spring having a loop therein to secure the gasket in a coupling, the frame being formed with a thickened portion having closed recesses to receive the end of the spring and said thickened portion serving to hold the frame and body of the gasket the more securely together.

This specification signed and witnessed this 13th day of January, A. D., 1908.

JOHN E. WARD.

Signed in the presence of—
 LUCIUS E. VARNEY,
 MARJORIE ROLLINS.